(12) United States Patent
Ball

(10) Patent No.: US 8,143,923 B2
(45) Date of Patent: Mar. 27, 2012

(54) CIRCUIT AND METHOD FOR DETERMINING A CURRENT

(75) Inventor: Alan R. Ball, Gilbert, AZ (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 63 days.

(21) Appl. No.: 12/632,600

(22) Filed: Dec. 7, 2009

(65) Prior Publication Data

US 2011/0133787 A1 Jun. 9, 2011

(51) Int. Cl.
*H02M 11/00* (2006.01)
(52) U.S. Cl. .......................................... 327/103; 363/73
(58) Field of Classification Search .................. 327/103; 363/13, 73
See application file for complete search history.

(56) References Cited

U.S. PATENT DOCUMENTS

| 5,477,132 | A | * | 12/1995 | Canter et al. ................... 323/282 |
| 6,373,734 | B1 | | 4/2002 | Martinelli |
| 2008/0084117 | A1 | * | 4/2008 | Sander et al. ................... 307/46 |
| 2008/0252265 | A1 | * | 10/2008 | Kokubun et al. ............... 320/162 |
| 2011/0057625 | A1 | * | 3/2011 | Ashida ............................ 320/162 |

OTHER PUBLICATIONS

Texas Instruments Incorporated, "Host-contolled Multi-chemistry Battery Charger, with System Power Selector, AC Over-Power Protection, and Programmalbe OVP", bq24751 Data Sheet, 2006-2009.
Jinrong Qian, "A Method for Minimizing Notebook AC Adapter Power Rating and Battery Charging Time", Application Note, Intersil Corporation May 7, 2004.
Maxim Integrated Products, "SMBUS Level 2 Battery Charger with Remote Sense", MAX8731 Data Sheet, maxim-ic.com 19-3923; Rev 0; Jan. 2006.

* cited by examiner

*Primary Examiner* — Lincoln Donovan
*Assistant Examiner* — William Hernandez
(74) *Attorney, Agent, or Firm* — Rennie William Dover

(57) ABSTRACT

A power supply circuit having a converter circuit and method for determining a current flowing into the converter circuit. A converter circuit includes an amplifier and a current-to-current converter module. The amplifier has a current sensing element coupled between its inverting and noninverting input terminals. The amplifier generates a sensing signal from a charging current flowing through the current sensing element. The sensing signal is input into the current-to-current converter module, which scales the charging current and modulates the scaled charging current. The current-to-current converter module converts the modulated current to a charging voltage that is representative of the charging current. The charging current is converted to a current that is representative of the input current to converter circuit. The input current to the converter circuit is added to an auxiliary load current to yield the current of the power supply circuit.

13 Claims, 2 Drawing Sheets

CIRCUIT AND METHOD FOR DETERMINING A CURRENT

TECHNICAL FIELD

The present invention relates, in general, to semiconductor components and, more particularly, to semiconductor components that include a converter circuit.

BACKGROUND

Semiconductor components are used in a variety of portable electronic devices including laptop computers, cellular phones, personal digital assistants, video games, video cameras, etc. In these applications the devices may be operated without being connected to an external Alternating Current (AC) power source. Here a battery may be used to provide the power. However, operating the devices in this mode depletes charge from the battery such that they should be recharged. When recharging the batteries, it is desirable to quickly recharge them without an excessive power loss during the recharge operation so the devices can be used in a portable mode as quickly as possible.

FIG. 1 is a circuit schematic of a prior art converter circuit 10. What is shown in FIG. 1 is a resistor 12 having a terminal connected to a noninverting input terminal of an amplifier 14 and a terminal connected to the inverting input terminal of amplifier 14. The noninverting input terminal of amplifier 14 and the terminal of resistor 12 connected to the inverting input terminal of amplifier 14 are coupled for receiving an input signal at node or input terminal 16. Amplifier 14 has an output terminal 13 which provides a voltage signal $V_{IR12}$ that is representative of a current $I_{R12}$ flowing through resistor 12. The other terminal of resistor 12 is commonly connected to a system load 20 and to a drain terminal of a Metal Oxide Semiconductor Field Effect Transistor (MOSFET) 22. MOSFET 22 has a gate terminal coupled for receiving a Pulse Width Modulation (PWM) control signal from a PWM control circuit 24 and a source terminal commonly connected to the drain terminal of a MOSFET 26 and to a terminal of an inductor 28. The other terminal of inductor 28 is commonly connected to a non-inverting input terminal of an amplifier 30 and to a terminal of a resistor 32. The other terminal of resistor 32 is commonly connected to an inverting input terminal of amplifier 30 and to a capacitor 34 and a battery 36 to form an output terminal 38 at which an output voltage $V_{OUT}$ appears. Amplifier 30 has an output terminal 31.

In operation, current $I_{R12}$ flows into node 18. A portion $I_{L20}$ of current $I_{R12}$ flows to system load 20 and a portion $I_{D22}$ of current $I_{R12}$ flows to the drain terminal of MOSFET 22 from which a portion $I_{R32}$ flows through resistor 32. A voltage $V_{IR12}$ appears at output terminal 13 and a voltage $V_{IR32}$ appears at output terminal 31. Thus, converter circuit 10 includes two current loops where one of the current loops measures input current $I_{R12}$ and the other measures, for example, a battery charging current $I_{R32}$. Transmitting battery charging current $I_{R32}$ through two sense resistors, i.e., resistors 12 and 32, increases the amount of power dissipated from converter circuit 10 making it inefficient.

Accordingly, it would be advantageous to have a method and circuit for determining a charging current that operates efficiently. It would be of further advantage for the method and circuit to be cost efficient to manufacture and operate and to be reliable.

BRIEF DESCRIPTION OF THE DRAWINGS

The present invention will be better understood from a reading of the following detailed description, taken in conjunction with the accompanying drawing figures, in which like reference characters designate like elements and in which.

DETAILED DESCRIPTION

Generally, the present invention provides a power supply circuit 100 that includes a charging circuit 101 and a method for determining an input current flowing into charging circuit 101. In accordance with embodiments, a system current $I_{SYS}$ of power supply circuit 100 is substantially equal to the sum of an input current $I_{QIN}$ of charging circuit 101 and an auxiliary current $I_{AUX}$ that flows into a system load 126. A charging current $I_{CHG}$ flowing through an impedance is converted into a reflection voltage $V_{IQIN}$ and auxiliary current $I_{AUX}$ flowing through another impedance is converted into a summer input voltage $V_{AUX}$. Reflection voltage $V_{IQIN}$ is representative of input current $I_{QIN}$ and summer input voltage $V_{AUX}$ is representative of auxiliary current $I_{AUX}$. Thus, input current $I_{QIN}$ is determined by measuring charging current $I_{CHG}$ through an impedance and converting it into the equivalent input current $I_{QIN}$. By way of example, input current $I_{QIN}$ of charging circuit 101 may be determined by sensing charging current $I_{CHG}$ and scaling charging current $I_{CHG}$ to generate a scaled charging current $I_{DRV}$. The scaled charging current $I_{DRV}$ is modulated to generate a modulated current $I_{MOD}$, which is converted to a voltage $V_{IQIN}$. Reflection voltage $V_{IQIN}$ is added to summer input voltage $V_{AUX}$ to form a system voltage $V_{SYS}$ that is representative of system current $I_{SYS}$.

Figure 2:
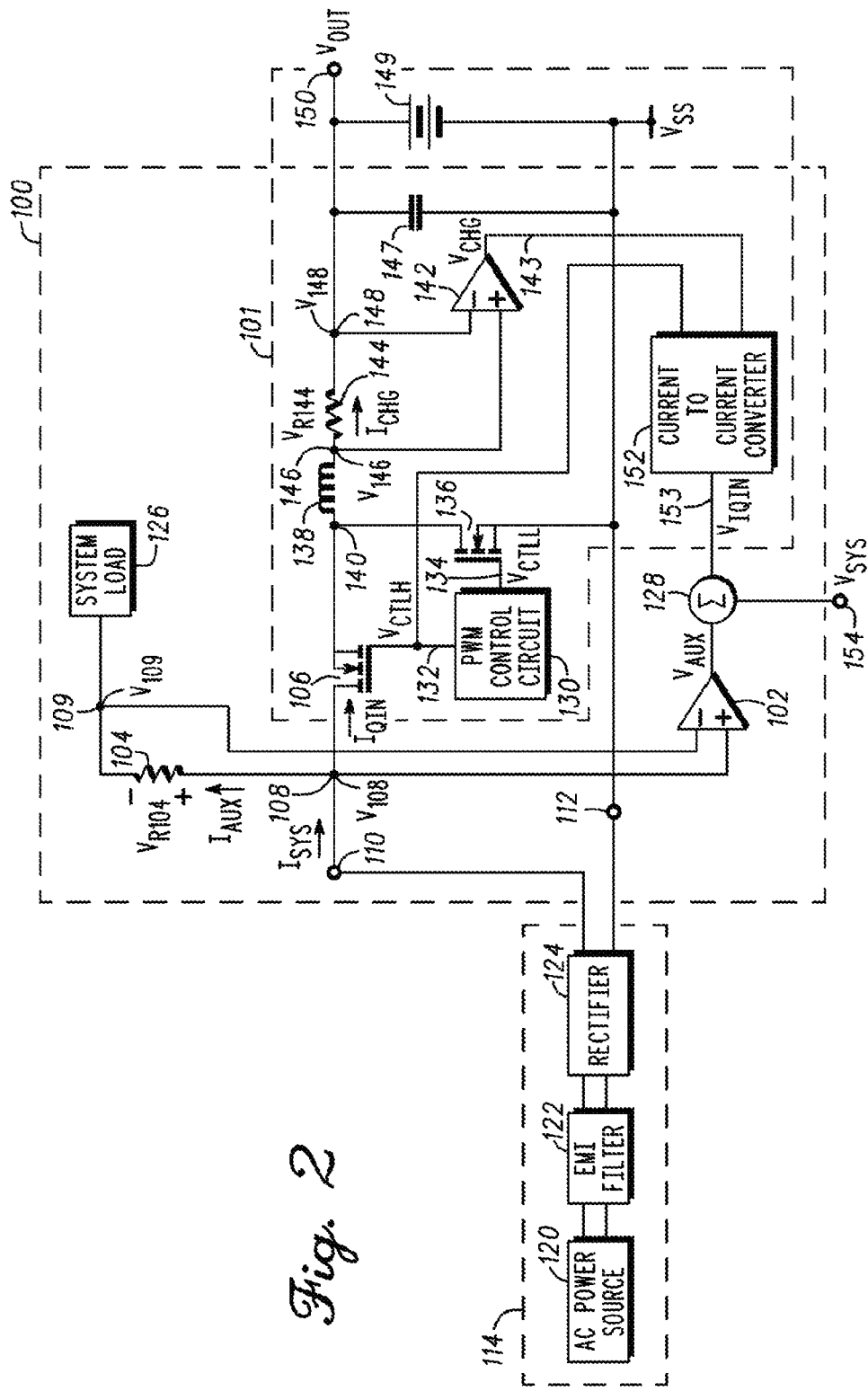
FIG. 2 is a circuit schematic of a power supply circuit that includes a switching converter circuit in accordance with an embodiment of the present invention.

FIG. 2 is a circuit schematic of a power supply circuit 100 that includes a charging circuit 101 having reduced power dissipation in accordance with an embodiment of the present invention. What is shown in FIG. 2 are input terminals 110 and 112 of power supply circuit 100 connected to corresponding output terminals of an Alternating Current (AC) adapter 114. It should be noted that the source of power for power supply circuit 100 is not limited to being an AC adapter. Other suitable sources of power include a Direct Current (DC) power adapter, photovoltaic circuits, fuel cells, etc. AC adapter 114 may be comprised of an ElectroMagnetic Interference (EMI) filter 122 coupled to a rectifier 124. EMI filter 122 has input terminals coupled for receiving an input signal from an AC power source 120 and rectifier 124 has output terminals connected to input terminals 110 and 112 of power supply circuit 100. Thus power supply circuit 100 is coupled for receiving an input signal through input terminals 110 and 112, where input terminal 112 serves as a current return terminal. By way of example, power supply circuit 100 comprises an amplifier 102 having a noninverting input terminal, an inverting input terminal, an output terminal, and a gain $A_1$ that may be achieved using a feedback network that is not shown. The noninverting input terminal is commonly connected to a terminal of an impedance 104 which may be, for example a resistor, and to a drain terminal of a MOSFET 106 to form a node 108. Node 108 is connected to input terminal 110. It should be noted that node 108 may serve as input terminal 110. The inverting input terminal of amplifier 102 is commonly connected to the other terminal of resistor 104 and to the input terminal of a system load 126 to form a node 109. Suitable examples of system load 126 include a Central Processing unit (CPU), a chip set, a Double Data Rate Synchronous Dynamic Random Access Memory (DDR SDRAM), or the like. The output terminal of amplifier 102 is connected to an input terminal of a summer 128. Summer 128 may be referred to as a summer circuit or a summing circuit.

MOSFET 106 has a gate terminal coupled for receiving a control signal $V_{CTLH}$ from an output terminal 132 of a PWM control circuit 130 and a source terminal commonly connected to the drain terminal of a MOSFET 136 and to a terminal of an energy storage device or element 138 to form a node 140. MOSFET 136 has a gate terminal coupled for receiving a control signal $V_{CTLL}$ from an output terminal 134 of PWM control circuit 130 and a source terminal coupled for receiving a source of operating potential $V_{SS}$. By way of example, source of operating potential $V_{SS}$ is at a ground potential. It should be noted that the drain and source terminals of devices such as, for example, MOSFETS 106 and 136 may be referred to as current carrying electrodes and the gate terminals of MOSFETS 106 and 136 may be referred to as control terminals. It should be further noted that devices 106 and 136 are not limited to being MOSFETS. Other suitable devices for transistors 106 and 136 include field effect transistors, bipolar junction transistors, junction field effect transistors, or the like.

Power supply circuit 100 further includes an amplifier 142 having a noninverting input terminal, an inverting input terminal, an output terminal 143, and a gain $A_2$ that may be achieved using a feedback network that is not shown. The noninverting input terminal is commonly connected to the other terminal of energy storage element 138 and to a terminal of an impedance 144 at a node 146. By way of example, impedance 144 is a resistor. The inverting input terminal of amplifier 142 is commonly connected to the other terminal of resistor 144 and to a terminal of a capacitor 147 to form a node 148. Node 148 is connected to a charging terminal 150 of power supply circuit 100. The other terminal of capacitor 147 is coupled for receiving source of operating potential $V_{SS}$. Output terminal 143 of amplifier 142 is connected to an input terminal of a current-to-current converter module 152 and output terminal 132 of PWM control circuit 130 is connected to another input terminal of current-to-current converter module 152. Converter module 152 has an output terminal 153 connected to an input terminal of summer 128 and generates a voltage signal $V_{IQIN}$ at its output terminal that is representative of the drain-to-source current flowing through MOSFET 106. Summer 128 sums the signals from amplifier 102 and from converter module 152 to form a summed signal $V_{SYS}$ at output terminal 154 that is representative of current $I_{SYS}$ flowing into node 108. MOSFETS 106 and 136, PWM control circuit 130, inductor 138, resistor 144, amplifier 142, and current-to-current converter module 152 may be referred to as a charging circuit 101. Summed signal $V_{SYS}$, which is representative of current $I_{SYS}$, is converted to current $I_{SYS}$.

Figure 1:
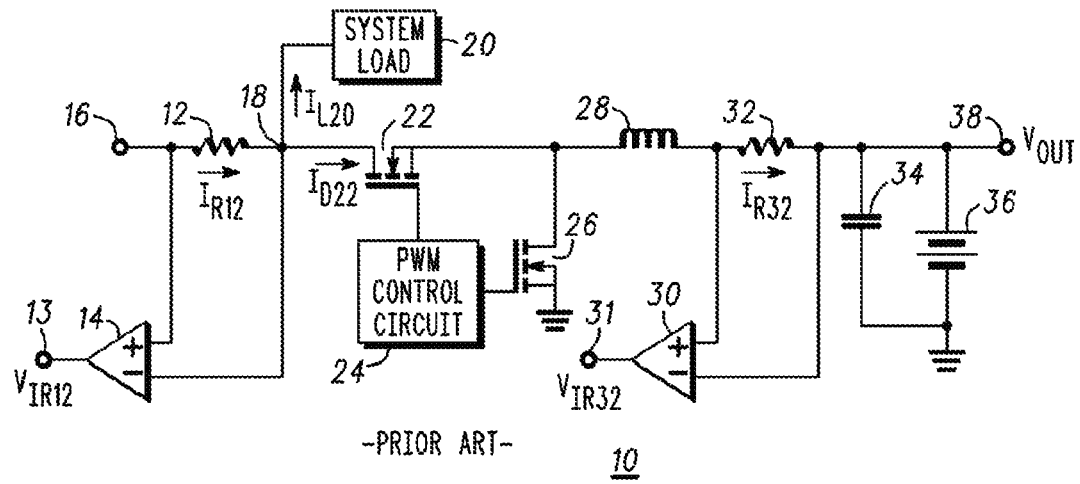
FIG. 1 is a circuit schematic of a portion of a prior art converter circuit.
Figure 3:
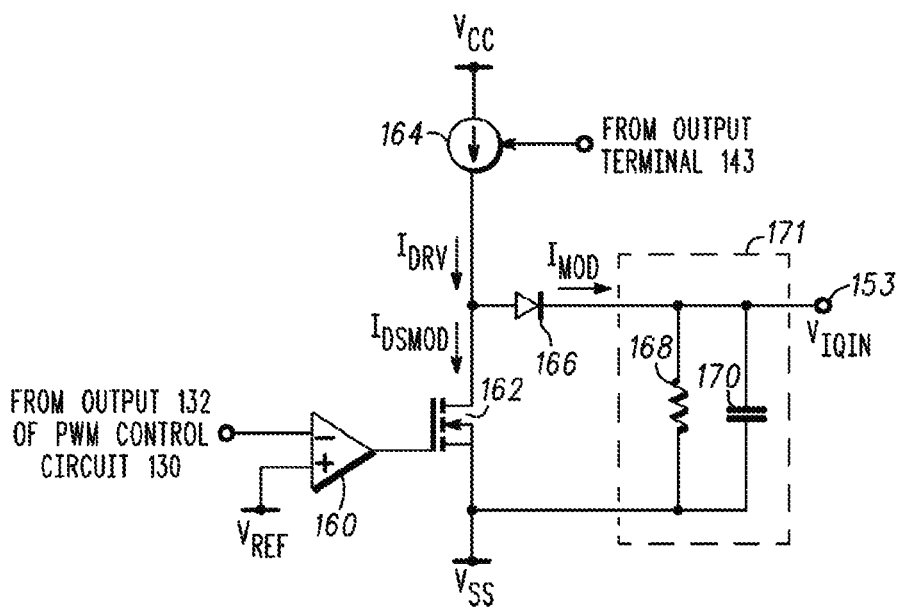
FIG. 3 is a circuit schematic of a portion of the power supply circuit of FIG. 2.

FIG. 3 is a circuit schematic of current-to-current converter module 152 in accordance with an embodiment in which current-to-current converter module 152 comprises a comparator 160 having an inverting input terminal coupled to output terminal 132 of PWM control circuit 130, a noninverting input terminal coupled for receiving a reference voltage $V_{REF}$, and an output terminal coupled to a gate terminal of a MOSFET 162. MOSFET 162 has a source terminal coupled for receiving source of operating potential $V_{SS}$ and a drain terminal commonly connected to a current carrying terminal of a voltage controlled current source 164 and to an anode of a diode 166. Voltage controlled current source 164 has another current carrying terminal coupled for receiving a source of operating potential $V_{CC}$ and a control terminal connected to output terminal 143 of amplifier 142 (shown in FIG. 2). The cathode of diode 166 is commonly connected to a terminal of a resistor 168 and to a terminal of a capacitor 170 to form charging terminal 153. Voltage $V_{IQIN}$ appears at charging terminal 153. The other terminals of resistor 168 and capacitor 170 are coupled for receiving, for example, source of operating potential $V_{SS}$. Resistor 168 and capacitor 170 cooperate to form a filter 171. Although converter module 152 has been shown and described as being in a switching configuration, this is not a limitation of the present invention. In another suitable configuration, converter module 152 is comprised of an analog multiplier circuit.

In operation, a current $I_{SYS}$ is generated in response to the AC signal from AC adapter 114. PWM control circuit 130 generates pulse width modulated output signals $V_{CTLH}$ and $V_{CTLL}$ at output terminals 132 and 134 for turning on and off MOSFETS 106 and 136, respectively. When MOSFET 106 is on and conducting, current $I_{SYS}$ flows into node 108 and is divided into portions $I_{AUX}$ and $I_{QIN}$. Portion $I_{AUX}$ is referred to as the auxiliary load current or an auxiliary current and flows through resistor 104 into system load 126 and portion $I_{QIN}$ is referred to as the charger input current and flows from the drain terminal to the source terminal of MOSFET 106 and towards charging terminal 150. Thus, power supply circuit 100 has a system path coupled to node 108 that receives portion $I_{AUX}$ of system current $I_{SYS}$ and a battery charging path coupled to node 108 that receives portion $I_{QIN}$ of system current $I_{SYS}$. Current $I_{AUX}$ flows through resistor 104 but is absent from resistor 144 and current $I_{QIN}$ flows through resistor 144 but is absent from resistor 104. Current $I_{AUX}$ generates a current sense voltage $V_{R104}$ across resistor 104, i.e., current sense voltage $V_{R104}$ is the voltage appearing between the noninverting input terminal and the inverting input terminal of amplifier 102 or the voltage appearing between nodes 108 and 109, where the voltage at node 108 may be identified by reference character $V_{108}$ and the voltage at node 109 may be identified by reference character $V_{109}$. It should be noted that current sense voltage $V_{R104}$ may be referred to as a difference voltage because it is the difference between voltages $V_{108}$ and $V_{109}$. Resistor 104 may be referred to as a voltage generating element or a current sensing element. In response to current sense voltage $V_{R104}$, amplifier 102 generates a voltage $V_{AUX}$ at its output terminal that may be referred to as a scaled current sense voltage. Thus, resistor 104 is used to sense current $I_{AUX}$. Voltage $V_{AUX}$ is transmitted to one of the input terminals of summer 128.

A charging current $I_{CHG}$ generates a current sense voltage $V_{R144}$ across resistor 144, i.e., voltage $V_{R144}$ appears between the noninverting input terminal and the inverting input terminal of amplifier 142 or between nodes 146 and 148, where the voltage at node 146 may be identified by reference character $V_{146}$ and the voltage at node 148 may be identified by reference character $V_{148}$. Resistor 144 may also be referred to as a voltage generating element or a current sensing element. Thus, resistor 144 is used to sense current $I_{CHG}$. It should be noted that charging current $I_{CHG}$ is not limited being determined using resistor 144. For example, charging current $I_{CHG}$ can be determined using a low side sense FET, a high side sense FET, or both low and high side sense FETS, or the like. In response to voltage $V_{R144}$, amplifier 142 generates a scaled voltage $V_{CHG}$ at output terminal 143 which is transmitted to an input terminal of current-to-current converter module 152. Scaled voltage $V_{CHG}$ is also referred to as a charging voltage. In addition, a pulse width modulated voltage signal $V_{CTLH}$ from output terminal 132 of PWM control circuit 130 is transmitted to current-to-current converter module 152. In response to signals $V_{CHG}$ and $V_{CTLH}$, current-to-current converter module 152 generates a voltage $V_{IQIN}$ at output terminal 153 that is representative of charging current $I_{QIN}$. The operation of current-to-current converter module 152 is further described with reference to FIG. 3. Voltage $V_{IQIN}$ is transmitted to another of the input terminals of summer 128. Summer 128 generates an output voltage $V_{SYS}$ that is the sum of voltages $V_{AUX}$ and $V_{IQIN}$, where voltage $V_{SYS}$ is representative of current $I_{SYS}$ that flows into node 108.

Referring now to FIG. 3, charging current $I_{CHG}$ flows through resistor 144 and generates a current sense voltage $V_{R144}$ that is representative of current $I_{CHG}$. Thus, resistor 144 is used to sense charging current $I_{CHG}$. It should be noted that voltage $V_{R144}$ may be referred to as a difference voltage because it is the difference between voltages $V_{146}$ and $V_{148}$. Amplifier 142 generates scaled voltage $V_{CHG}$ by scaling current sense voltage $V_{R144}$. Scaling current sense voltage $V_{R144}$ increases its signal level which provides improved noise immunity and accuracy. Because current sense voltage $V_{R144}$ is representative of charging current $I_{CHG}$, scaling current sense voltage $V_{R144}$ amounts to scaling charging current $I_{CHG}$. Scaled voltage $V_{CHG}$ serves as a control voltage for voltage controlled current source 164, which generates a scaled current $I_{DRV}$ that is proportional to the nominal value of current $I_{CHG}$. In accordance with an example, scaled voltage $V_{CHG}$ scales a current from voltage controlled current source 164 to generate a scaled current $I_{DRV}$ that has a lower value than current $I_{CHG}$, which improves the efficiency of current-to-current converter 152. PWM control circuit 130 transmits a PWM control signal $V_{CTLH}$ from output terminal 132 to the inverting input terminal of comparator 160. By way of example, control signal $V_{CTLH}$ is a pulse train having a duty cycle that is set to drive switch 106. The duty cycle provides a scaling factor $K_{SCL}$ for changing input voltage $V_{108}$ (shown at node 108 in FIG. 2) to the output voltage $V_{OUT}$ which appears between output terminal 150 and source of operating potential $V_{SS}$. In addition, scaling actor $K_{SCL}$ that is contained in control signal $V_{CTLH}$ can be used to generate charging input current $I_{QIN}$ by scaling charging current $I_{CHG}$.

Comparator 160 generates a control signal for controlling MOSFET 162, where the control signal has the inverse duty cycle as control signal $V_{CTLH}$. When switching transistor 106 conducts current, MOSFET 162 is not conducting a substantial current. When MOSFET 162 is operating in a nonconducting mode, a portion $I_{MOD}$ of scaled current $I_{DRV}$ flows into output filter 171 adding charge to capacitor 170 and generating a voltage $V_{IQIN}$ that is representative of input current $I_{QIN}$. Voltage $V_{IQIN}$ may be referred to as a reflection voltage and is filtered by output filter 171. Accordingly, scaled current $I_{DRV}$ is converted to reflection voltage $V_{IQIN}$. Thus, MOSFET 162 steers portion $I_{MOD}$ of current $I_{DRV}$ towards output filter 171 while a portion $I_{DSMOD}$ of current $I_{DRV}$ flows to source of operating potential $V_{SS}$ through MOSFET 162. During the time interval when switching transistor 106 is not conducting, MOSFET 162 conducts current and shunts or steers current $I_{DRV}$ from current source 164 to ground so that it does not add any charge or energy to output filter 171. Diode 166 blocks the conduction path from output filter 171 when MOSFET 162 is conducting which would otherwise discharge capacitor 170 of output filter 171. Resistor 168 in combination with capacitor 170 sets a time constant for integrating the pulsed current signal from current $I_{MOD}$. The time constant set by resistor 168 and capacitor 170 is typically about ten times slower than the pulse frequency of control signal $V_{CTLH}$. It should be noted that the time constant can be increased or decreased by selecting the values of resistor 168 and capacitor 170.

As discussed above with reference to FIG. 2, summer 128 sums voltages $V_{AUX}$ and $V_{CHG}$ to generate a summed voltage $V_{SYS}$ that is representative of system current $I_{SYS}$. It should be noted that system current $I_{SYS}$ substantially equals the sum of currents $I_{AUX}$ and $I_{QIN}$. Current $I_{QIN}$ may be referred to as a reflection current because it is representative of charging current $I_{CHG}$ which is reflected back to the drain of MOSFET 106. The system uses summed voltage $V_{SYS}$ to monitor the total input current from AC adapter 114 or from some other source to control charging current $I_{CHG}$ if system current $I_{SYS}$ reaches a level that exceeds the current limit of AC adapter 114.

By now it should be appreciated that a circuit and method for determining current flowing in a power supply circuit have been provided. In accordance with embodiments, the system current $I_{SYS}$ of the power supply circuit is the sum of a system load or auxiliary current $I_{AUX}$ and a charger module or circuit current $I_{QIN}$. The charger module current $I_{QIN}$ can be determined by converting a charging current $I_{CHG}$ into a current sense voltage and scaling the current sense voltage to generate a scaled voltage $V_{CHG}$, which serves as a control voltage for a voltage controlled current source. The scaled voltage $V_{CHG}$ scales a current source current. The scaled current source current is routed in accordance with a pulse width modulation signal to generate a reflection voltage $V_{IQIN}$. A current sense voltage is generated from auxiliary current $I_{AUX}$ and scaled to form a summer input voltage $V_{AUX}$. Voltages $V_{IQIN}$ and $V_{AUX}$ are summed to form a system voltage $V_{SYS}$ that is representative of system current $I_{SYS}$. Summing voltages $V_{IQIN}$ and $V_{AUX}$ is analogous to summing currents $I_{QIN}$ and $I_{AUX}$ to derive system current $I_{SYS}$. Currents $I_{QIN}$ and $I_{AUX}$ flow along two separate paths where each path has a reduced number of resistive elements thereby reducing the resistive losses. This configuration lowers power dissipation by reducing the impedance path losses because the battery charging current flows through a lower resistance.

Although specific embodiments have been disclosed herein, it is not intended that the invention be limited to the disclosed embodiments. Those skilled in the art will recognize that modifications and variations can be made without departing from the spirit of the invention. It is intended that the invention encompass all such modifications and variations as fall within the scope of the appended claims.

What is claimed is:

1. A method for determining a system current in a circuit that includes a converter circuit, comprising:
    splitting the system current into an input current and an auxiliary current, wherein the input current flows through a first resistor and a first energy storage element and the auxiliary current flows through a second resistor, and wherein a second energy storage element is absent from a current flow path of the auxiliary current;
    converting a charging current into a reflection voltage representative of the input current;
    converting the auxiliary current into a summer input voltage; and
    adding the reflection voltage to the summer input voltage to generate a charger input voltage that is representative of the system current.

2. The method of claim 1, wherein converting the auxiliary current into the summer input voltage comprises amplifying a first difference voltage to generate the summer input voltage.

3. The method of claim 2, wherein converting the charging current into the reflection voltage comprises generating a second difference voltage and further including amplifying the second difference voltage to generate a scaled current sense voltage.

4. A method for determining a system current in a circuit that includes a converter circuit, comprising:
- converting a charging current into a reflection voltage, wherein converting the charging current into the reflection voltage includes:
  - generating a pulse width modulated control voltage;
  - using the scaled current sense voltage and the pulse width modulated control voltage to generate a reflection current; and
  - generating the reflection voltage from the reflection current, and
- converting an auxiliary current into a summer input voltage; and
- adding the reflection voltage to the summer input voltage to generate a charger input voltage that is representative of the system current.

5. The method of claim 4, wherein converting the charging current into the reflection voltage includes transmitting the charging current through a first impedance element.

6. The method of claim 5, wherein converting the auxiliary current into the summer input voltage includes transmitting the auxiliary current through a second impedance element.

7. The method of claim 6, wherein the charging current is absent from the second impedance element when transmitting the charging current through the first impedance element and the auxiliary current is absent from the first impedance element when transmitting the auxiliary current through the second impedance element.

8. A power supply circuit, comprising:
- a system path coupled to a first node for receiving a first portion of a current, the system path comprising a first impedance having first and second terminals, wherein an energy storage elements is absent from the system path; and
- a battery charging path coupled to the first node for receiving a second portion of the current, the battery charging path comprising a second impedance having first and second terminals and wherein the first impedance is absent from the battery charging path and the energy storage element is present in the battery charging path.

9. The power supply circuit of claim 8, further including:
- a first amplifier having first and second input terminals and an output terminal, the first input terminal coupled to the first terminal of the first impedance and the second input terminal coupled to the second terminal of the first impedance; and
- a summer circuit having first and second input terminals, the first input terminal coupled to the output terminal of the first amplifier.

10. The power supply circuit of claim 9, further including:
- a second amplifier having first and second input terminals and an output terminal, the first input terminal coupled to the first terminal of the second impedance and the second input terminal coupled to the second terminal of the second impedance;
- a converter circuit having first and second input terminals and an output terminal, the first input terminal coupled to the output terminal of the second amplifier and the output terminal of the converter circuit coupled to second input terminal of the summer circuit; and
- a pulse width modulated control circuit having first and second output terminals, the first output terminal coupled to the second input terminal of the converter.

11. The power supply circuit of claim 10, further including:
- a first transistor having first and second current carrying electrodes and a control electrode, the first current carrying electrode coupled to the first node, the second current carrying electrode coupled to the second impedance, and the control electrode coupled to the first output terminal of the pulse width modulated control circuit; and
- a second transistor having first and second current carrying electrodes and a control electrode, the first current carrying electrode coupled to the second current carrying electrode of the first transistor and the control electrode coupled to the second output terminal of the control circuit.

12. The power supply circuit of claim 11, wherein the converter circuit comprises:
- a comparator having first and second input terminals and an output terminal, the first input terminal coupled to the first output terminal of the pulse width modulated control circuit;
- a third transistor having a control electrode and first and second current carrying electrodes, the control electrode coupled to the output terminal of the comparator;
- a current source having a current carrying terminal coupled to the first current carrying electrode of the third transistor; and
- a resistor having first and second terminals, the first terminal coupled to the current carrying terminal of the current source.

13. The circuit of claim 12, wherein the current source is a voltage controlled current source.

* * * * *